United States Patent [19]
Levine

[11] Patent Number: 5,815,162
[45] Date of Patent: Sep. 29, 1998

[54] SYSTEM AND METHOD OF DRAWING ANTI-ALIASED LINES USING A MODIFIED BRESENHAM LINE-DRAWING ALGORITHM

[75] Inventor: Marshall P. Levine, Philadelphia, Pa.

[73] Assignee: Silicon Graphics, Inc., Mountain View, Calif.

[21] Appl. No.: 634,877

[22] Filed: Apr. 19, 1996

[51] Int. Cl.$^6$ .................................................. G06T 11/00
[52] U.S. Cl. ............................................................ 345/443
[58] Field of Search ........................... 395/133, 141–143, 395/170, 523, 126, 128–132; 345/433, 441–443, 470, 136, 523, 426, 428–432

[56] References Cited

U.S. PATENT DOCUMENTS 5,422,991  6/1995  Fowler ..................................... 395/143
5,544,294  8/1996  Cho et al. ............................... 395/141

*Primary Examiner*—Almis R. Jankus
*Attorney, Agent, or Firm*—Sterne, Kessler, Goldstein & Fox P.L.L.C.

[57] ABSTRACT

Described herein are a system and method for drawing high-quality, mathematically perfect or near-perfect anti-aliased lines by using a modified integer Bresenham line-drawing algorithm that yields optimally accurate coverage values. These coverage values are derived from the Bresenham algorithm itself without the computational expense of an arithmetic division at each pixel. The Bresenham algorithm generates pixel coordinates and coverage values of a line by iterating the line's minor axis coordinate with subpixel precision.

17 Claims, 11 Drawing Sheets

EXAMPLE OF LINE TERMS OVER TWO PIXELS WHERE k=8

X AXIS

MAJOR AXIS

MAJOR AXIS

| OCTANT | INITIAL ERROR/INITIAL y | SIGN (dx) | SIGN (dy) | OVERFLOW ON |
|---|---|---|---|---|
| 1 | $e_0 = \dfrac{-1}{2k} + \dfrac{k \times (x_0-x_1) \times n - [k \times (x_0-x_1) \times n]}{k} + (x_0-x_1) \times einc$ <br> $y_0 = y_1 + \dfrac{[k \times (x_0-x_1) \times n]}{k}$ | +1 | +1 | $e \geq 0.0$ |
| 8 | $e_0 = \dfrac{-1}{2k} + \dfrac{k \times (x_0-x_1) \times n - [k \times (x_0-x_1) \times n]}{k} + (x_0-x_1) \times einc$ <br> $y_0 = y_1 + \dfrac{[k \times (x_0-x_1) \times n]}{k}$ | +1 | −1 | $e > 0.0$ |
| 4 | $e_0 = \dfrac{-1}{2k} + \dfrac{k \times (x_0-x_1) \times n - [k \times (x_1-x_0) \times n]}{k} + (x_0-x_1) \times einc$ <br> $y_0 = y_1 + \dfrac{[k \times (x_1-x_0) \times n]}{k}$ | −1 | +1 | $e \geq 0.0$ |
| 5 | $e_0 = \dfrac{-1}{2k} + \dfrac{k \times (x_0-x_1) \times n - [k \times (x_1-x_0) \times n]}{k} + (x_1-x_0) \times einc$ <br> $y_0 = y_1 + \dfrac{[k \times (x_1-x_0) \times n]}{k}$ | −1 | −1 | $e > 0.0$ |

FIG. 19

SYSTEM AND METHOD OF DRAWING ANTI-ALIASED LINES USING A MODIFIED BRESENHAM LINE-DRAWING ALGORITHM

RELATED PATENT APPLICATION

This patent application is related to commonly owned, co-pending application Ser. No. 08/634,875, filed Apr. 19, 1996, pending, titled "Calibration System and Method for Anti-Aliased Brightness Correction."

COPYRIGHT NOTICE

A portion of the disclosure of this patent application contains material which is subject to copyright protection. The copyright owner has no objection to the facsimile reproduction, by anyone, of the patent document or the patent disclosure, as it appears in the U.S. Patent and Trademark Office patent file or records, but otherwise reserves all copyright rights whatsoever.

BACKGROUND OF THE INVENTION

1. Field of the Invention

The invention relates to drawing high-quality, mathematically perfect anti-aliased lines with minimal computation. More particularly, the invention relates to a method for yielding pixel coverage data for anti-aliasing without performing an arithmetic division for each pixel.

2. Related Art

Modern computer video display devices (displays) usually consist of a regular grid of small points of light (PICture ELements, or pixels), each of which can be independently lit with a color (hue) and an intensity (brightness). One of the most fundamental problems in computer graphics is that of determining which set of pixels best represent an image, and which colors and intensities to assign to those pixels so that straight lines and edges can be drawn on a computer display.

The first step in drawing a straight line or edge on a computer display is that of determining which pixels on the display most closely approximate the line. The two algorithms most commonly used are digital differential analysis (or DDA) and Bresenham's algorithm. Before explaining the algorithms, it is necessary to define a few terms. A line that lies more horizontally than vertically is an X-major line. X-major lines are illustrated in FIG. 1. The "major axis" of such a line refers to the X-axis, while the "minor axis" refers to the Y-axis. Similarly, a line that lies more vertically than horizontally is a Y-major line. Y-major lines are illustrated in FIG. 2. The "major axis" of such a line refers to the Y-axis, while the "minor axis" refers to the X-axis. A pixel may be thought to have a square shape. When drawing lines on computer displays, some pixels will fall partly inside and partly outside of a line. The amount by which a pixel is covered by a line is referred to as the pixel's "coverage." An illustration of a line 300 covering pixels is shown in FIG. 3. The roughness, or staircase pattern, that is typically seen along straight edges and lines on computer displays is called "aliasing." It is possible to use the coverage data of pixels to reduce aliasing and give the appearance on the computer display of smooth lines and edges. This process is known as "anti-aliasing."

The first of the two aforementioned common line-drawing algorithms is the DDA algorithm. In the DDA algorithm, a line's slope is calculated and represented internally to the computer as an approximation of a fraction. The DDA algorithm then takes full pixel steps along the line's major axis and calculates the minor axis position of the line at each full pixel step by successively adding the fractional representation of the line's slope to the line's minor-axis position. In addition, the fractional component of the line's minor-axis position for each pixel along the line may be used to approximate each pixel's coverage. The DDA algorithm has the advantages that it is the simplest line-drawing algorithm, it typically requires little computation, and it provides information on each pixel's coverage. DDA is therefore the most commonly used algorithm for drawing anti-aliased lines. DDA has one important drawback. Computers are unable to represent fractions with perfect accuracy because the precision (or number of binary bits) used to represent each number is limited. For example, the fraction ⅓ might be represented inside of a computer as 0.33333, which is not completely accurate due to limited precision. Likewise, ⅔ might be represented as 0.66667, which is also not completely accurate. Hence, the DDA algorithm makes small errors when calculating a line's slope. These errors are realized when the DDA algorithm draws lines whose slopes are slightly different from those intended, so the lines sometimes diverge slightly from their target coordinates on computer displays.

The second common line-drawing algorithm is Bresenham's algorithm. In Bresenham's algorithm, lines are drawn using integer math; division is not performed and fractions are not used. Bresenham's algorithm enjoys perfect accuracy and full precision and, hence, it draws mathematically perfect lines. However, the algorithm does not easily yield pixel coverage data, as the DDA algorithm does. Pixel coverage must be calculated by performing an arithmetic division of two integers at each pixel. Since division is a computationally expensive operation, Bresenham's algorithm is inefficient at generating pixel coverage data and is therefore rarely used in drawing anti-aliased lines. For a discussion of Bresenham's algorithm see D. Rogers, "Procedural Elements for Computer Graphics," McGraw-Hill, 1985, pp. 34–42.

What is needed is a better way to draw accurate, straight lines and edges on computer displays. More particularly, what is needed is a way to obtain pixel coverage data for anti-aliasing without performing an arithmetic division for each pixel.

SUMMARY OF THE INVENTION

The present invention provides a modified integer Bresenham line-drawing algorithm that yields optimally accurate coverage values derived from the Bresenham algorithm itself without the computational expense of an arithmetic division at each pixel. Similar to the Bresenham algorithm, this invention enjoys perfect accuracy and full precision, yielding mathematically perfect lines. Yet, the algorithm of the present invention can be implemented with minimal hardware and is highly efficient, enabling computers to draw high quality, mathematically perfect anti-aliased lines with minimal computation.

BRIEF DESCRIPTION OF THE FIGURES

Referring now to the drawings which form a part of this original disclosure:

FIG. 19 shows a table with initialization equations associated with the X-major octants;

DETAILED DESCRIPTION OF THE PREFERRED EMBODIMENTS

An embodiment of the invention is now described with reference to the figures, where like numerals indicate identical or functionally similar elements. Also in the figures, the left-most digit of each reference number corresponds to the figure in which the reference number is first used. While specific configurations and arrangements are discussed, it should be understood that this is done for illustrative purposes only. Persons skilled in the relevant art will recognize that other configurations and arrangements can be used without departing from the spirit and scope of the invention. It will be apparent to a person skilled in the relevant art that this invention can also be employed in a variety of other devices and applications.

I. Overview

The invention relates to a Bresenham-like algorithm for drawing anti-aliased lines with optimal accuracy using minimal computation. Pixel coverage data for anti-aliasing is yielded without performing an arithmetic division for each pixel. The algorithm generates pixel coordinates and coverage values by iterating the line's minor-axis coordinate with subpixel precision. Since the lines have perfect accuracy, they are ideally suited for wrapping around Bresenham-based polygons to achieve antialiasing in 2D or depth-sorted 3D graphics.

II. Integer Bresenham Line Drawing Algorithm

Figure 4:
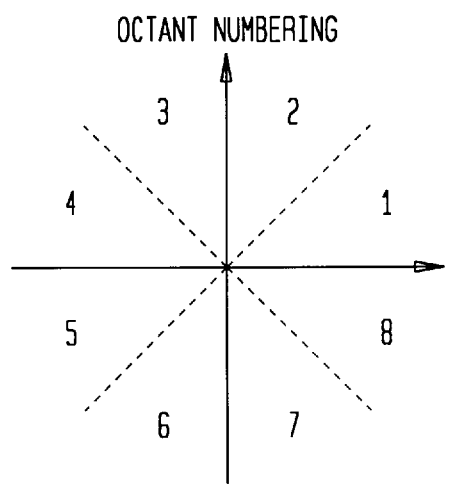
FIG. 4 shows octant numbering in accordance with the Bresenham's algorithm.
Figure 5:
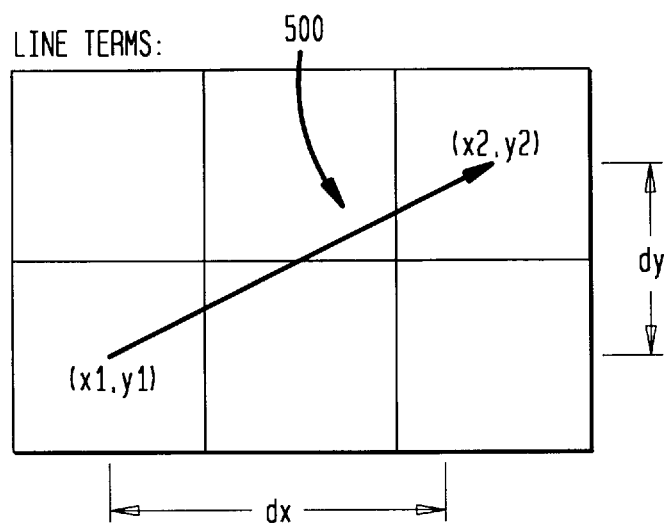
FIG. 5 shows line terms in accordance with Bresenham's algorithm.

The following provides a brief discussion of the integer Bresenham line drawing algorithm. For a more detailed explanation of the integer Bresenham line drawing algorithm, refer to "Procedural Elements for Computer Graphics." To use Bresenham's algorithm, the octants and line terms are named as shown in FIGS. 4 and 5. Referring to FIG. 5, x1, y1, x2 and y2 represent endpoints for line 500 as integers and must not be equal. dx is the length of line 500 along the x axis and dy is the length of line 500 along the y axis.

The following is an example of a x-major integer Bresenham line-drawing algorithm:

```
void bres (int x1, int x2, int y1, int y2)
{
    int x, y;            /* Iterated x and y */
    int dx, dy;          /* Delta x and delta y */
    int e;               /* Error term */
    int einc;            /* Error increment term */
    int edec;            /* Error decrement term */
    int I,
    x = x1;
    y = y1;
    dx = x2 - x1;
    dy = y2 - y1;
    e = -dx;             /* Initialize error term */
    for (I = 1; I <= dx; I++){
        draw(x, y);
        x++;
        e += 2*dy;
        while (e >= 0) {   /* Error term overflowed */
            y++;
            e -= 2*dx;
        }
    }
}
```

Figure 6:
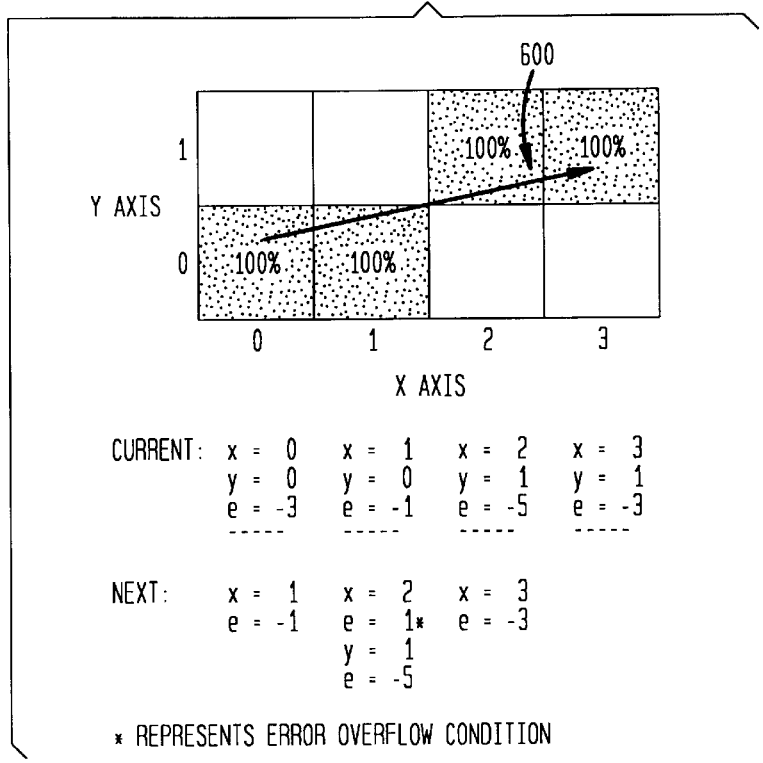
FIG. 6 shows an example of pixel coverage for a line drawn in accordance with Bresenham's algorithm.

FIG. 6 shows a line 600 drawn using the x-major integer Bresenham line-drawing algorithm above. Line 600 is drawn in octant 1 and the endpoints are: x1=0, y1=0, x2=3, y2=1. Delta x and delta y are: dx=3 and dy=1. For each column of pixels, the "current" values and the "next" values for x, y and e are shown below the column of pixels. These values are calculated by the Bresenham line-drawing algorithm above. To draw line 600 in accordance with Bresenham's algorithm, line 600 is incremented by taking full pixel steps along the major or x-axis and using the error term to determine whether to add 0 or 1 full pixels to the minor axis coordinate of the line at each major-axis iteration. Each pixel that is to be filled in or "lit-up " is done so at 100% because coverage is not calculated by this conventional integer Bresenham line drawing algorithm as discussed earlier. To begin drawing line 600, a first pixel (0,0) is filled in 100%. Then, a full pixel step is taken along the x-axis to x=1. No pixels steps are taken along the y-axis because the error value remains negative. Thus y remains at zero. In the next full pixel step along the x-axis, x=2, a full pixel step is taken along the y-axis because an error overflow condition (e has gone from negative to positive) has been indicated. Accordingly, pixel (2, 1) is filled in 100%. In accordance with Bresenham's line-drawing algorithm, e is made negative again. Then, another full pixel step is taken along the x-axis to x=3. No steps are taken along the y-axis because e is negative.

As discussed earlier, the integer Bresenham line drawing algorithm fails to utilize subpixel positioning, calculation of coverage values or consideration of endpoints that do not fall on the center of a pixel.

III. Modified Bresenham Algorithm Overview

Figure 7:
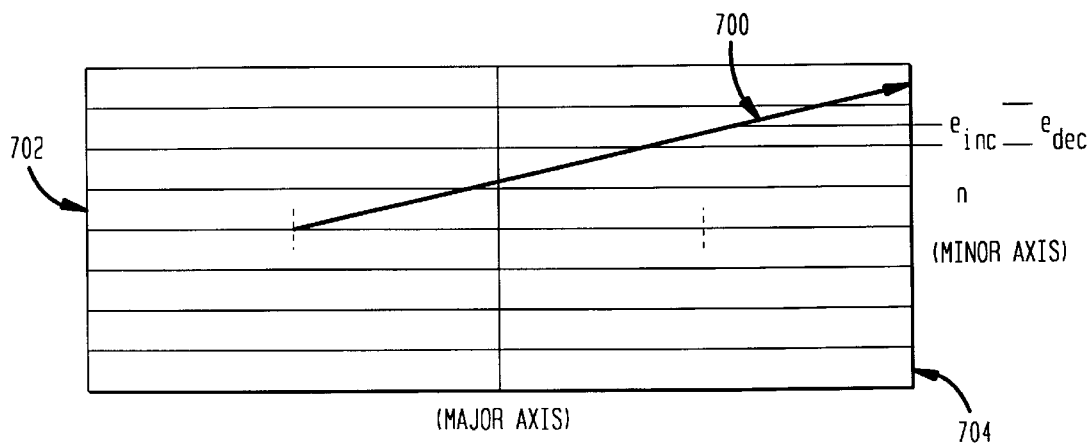
FIG. 7 shown an example of a line drawn in accordance with the present invention.

In discussing the anti-aliasing in accordance with the present invention, reference is made to FIG. 7. With the present each pixel is divided into subpixels along a minor axis of the line. In FIG. 7, two pixels 702 and 704 are shown where each pixel is divided into eight (8) subpixel spaces (k=8) because 8 is easily divisible by a power of 2 as will be discussed in Section V of this disclosure. A line 700 is iterated in such a fashion that the variable representing the current position along the minor axis contains subpixel precision. The subpixel position of line 700 along its minor axis for any given pixel gives a measure of coverage, in the amount that the neighboring pixels (not shown) along the minor axis are covered by the line.

During the initialization of the algorithm in accordance with the present invention, as will be discussed in detail below, a slope of line 700 is computed to determine the number of subpixel steps that line 700 makes in the minor direction for each full-pixel step in the major direction. This slope is defined as n. A modified version of the Bresenham error term, e, in accordance with the present invention, represents the distance between the iterated minor-axis coordinate of the line (quantized to 1/k subpixels) and the real minor-axis coordinate of the line. Where $e_{inc}$ is the error increment term, which is the amount by which the error term is incremented for each full-pixel major-axis step taken along the line. Therefore, $e_{inc}$ is the difference between the iterated slope, n, and the real slope. When the error term overflows, that is when the error term becomes nonnegative, the current iterated minor position is incremented by one subpixel unit. At each iteration, the error term determines whether to add n or n+(1/k) to the minor-axis position of the line. In Bresenham's algorithm, n vs. n+1 versions of the Bresenham algorithm are used for triangle-edge iteration.

In the integer Bresenham algorithm described earlier with reference to FIG. 6, the algorithm steps along the major axis direction and uses the error term to determine whether to add 0 or 1 pixels to the minor coordinate of the line at each major-axis iteration. The modified algorithm of the present invention steps along the major axis direction and adds n*k subpixels (where each pixel consists of k subpixels) to the line's minor axis at each iteration, unless the modified error term overflows. In that case, an extra subpixel is added to the line's minor axis position.

IV. Derivation of Equations

Next, expressions are derived for n, $e_{inc}$, and $e_{dec}$ for the four x-major octants. To begin, the definition of modulus is:

$$(a) \bmod (b) = a - b \left\lfloor \frac{a}{b} \right\rfloor .$$ Definition 1

And the definition of the line equation is:

$$y = \frac{dy}{dx} x + b$$

$$y = (x - x_1) \frac{dy}{dx} + y_1$$

where n should equal the floor of the number of sub-pixel steps in the minor direction that a line moves for each whole-pixel step in the major direction, while $e_{inc}$ should represent the remainder of n. n must be less than or equal to the true slope for octants 1 and 4 or greater than the true slope for octants 5 and 8. This can be accomplished easily by computing n based on the absolute values of dy and dx and then adding n to y at each iteration in dy-positive octants, while subtracting it from y in dy-negative octants. n must also be quantized to values in the domain of k units per pixel.

$$n = \frac{\left\lfloor \frac{k \times |dy|}{|dx|} \right\rfloor}{k} \qquad 0.0 \le n \le 1.0$$

$e_{inc}$ must be the remainder of this division.

$$e_{inc} = \frac{(k \times |dy|) \bmod |dx|}{|dx| \times k} \qquad 0.0 \le e_{inc} \le \frac{1}{k}$$

and $e_{dec}$ must be the largest possible value of the remainder:

$$e_{dec} = \frac{1}{k}$$

Lemma 1: n and $e_{inc}$ sum to the real slope.

Proof of Lemma 1:

$$\frac{|dy|}{|dx|} = \frac{\left\lfloor \frac{k \times |dy|}{|dx|} \right\rfloor}{k} + \frac{(k \times |dy| \bmod |dx|)}{|dx| \times k}$$

$$\frac{|dy|}{|dx|} = \frac{\left\lfloor \frac{k \times |dy|}{|dx|} \right\rfloor}{k} + \frac{(k + |dy|) - |dx| \left\lfloor \frac{k \times |dy|}{|dx|} \right\rfloor}{|dx| \times k}$$

$$\frac{|dy|}{|dx|} = \frac{\left\lfloor \frac{k \times |dy|}{|dx|} \right\rfloor}{k} + \frac{k \times |dy|}{k \times |dx|} - \frac{|dx| \left\lfloor \frac{k \times |dy|}{|dx|} \right\rfloor}{|dx| \times k}$$

$$\frac{|dy|}{|dx|} = \frac{|dy|}{|dx|}$$

The definitions of n and $e_{inc}$ must be modified to allow for sub-pixel steps in the line's major direction. Such a step is necessary if the first vertex of the line does not fall directly on a pixel center. To handle such a case, n and $e_{inc}$ are redefined.

Lemma 2: n and $e_{inc}$ can be scaled down any amount (with n still quantized to 1/k) and still equal the true slope scaled by that amount.

$$(x - x_1)n = \frac{k(x - x_1)n}{k}$$

$$(x - x_1)n = \frac{\lfloor k(x - x_1)n \rfloor}{k} + \left( \frac{k(x - x_1)n}{k} - \frac{\lfloor k(x - x_1)n \rfloor}{k} \right)$$

Notice that the two terms in parenthesis represent an amount smaller than 1/k, which violates the principle that n gives a measure of the slope quantized to 1/k units. We therefore define new expressions for slope and error increment.

$$(x - x_1)n_q = \frac{\lfloor k(x - x_1)n \rfloor}{k}$$

$$(x - x_1)e_{ineq} = (x - x_1) \frac{(k \times |dy|) \bmod (|dx|)}{|dx| \times k} +$$

$$\left( \frac{k(x - x_1)n}{k} - \frac{\lfloor k(x - x_1)n \rfloor}{k} \right)$$

Proof of Lemma 2:

$$(x - x_1) \frac{|dy|}{|dx|} = (x - x_1)n_q + (x - x_1)e_{ineq}$$

-continued $$(x - x_1) \frac{|dy|}{|dx|} = \frac{\lfloor k(x - x_1)n \rfloor}{k} +$$

$$(x - x_1) \frac{(k \times |dy|) \bmod(|dx|)}{|dx| \times k} +$$

$$\left( \frac{k(x - x_1)n}{k} - \frac{\lfloor k - (x - x_1)n \rfloor}{k} \right)$$

$$(x - x_1) \frac{|dy|}{|dx|} = (x - x_1) \frac{(k \times |dy| \bmod(|dx|)}{|dx| \times k} +$$

$$\frac{k(x - x_1) \frac{\lfloor \frac{k \times |dy|}{|dx|} \rfloor}{k}}{k}$$

$$(x - x_1) \frac{|dy|}{|dx|} = (x - x_1) \frac{(k \times |dy| \bmod(|dx|)}{|dx| \times k} +$$

$$\frac{(x - x_1) \lfloor \frac{k \times |dy|}{|dk|} \rfloor}{k}$$

$$(x - x_1) \frac{|dy|}{|dx|} =$$

$$(x - x_1) \left( \frac{(k \times |dy|) \bmod(|dx|)}{|dx| \times k} + \frac{\lfloor \frac{k \times |dy|}{|dx|} \rfloor}{k} \right)$$

By lemmma 1:

$$(x - xx_1) \frac{|dy|}{|dx|} = (x - x_1) \frac{|dy|}{|dx|}$$

It is worth noting that x−x1=1.0 in the general case of iterating whole-pixel steps in the line's major direction. In this case, $n_q$ and $e_{incq}$ reduce to n and $e_{inc}$: n=(1.0)$n_q$.

$$\frac{\lfloor \frac{k \times |dy|}{|dx|} \rfloor}{k} = (1.0) \frac{k(1.0) \frac{\lfloor \frac{k \times |dy|}{|dx|} \rfloor}{k}}{k}$$

$$\frac{\lfloor \frac{k \times |dy|}{|dx|} \rfloor}{k} = \frac{\lfloor \frac{k \times |dy|}{|dx|} \rfloor}{k}$$

$$e_{inc} = (1.0) \, e_{incq}$$

$$\frac{(k \times |dy|) \bmod(|dx|)}{|dx| \times k} = (1.0) \times$$

$$\dots \left( (1.0) \frac{(k \times |dy|) \bmod(|dx|)}{|dx| \times k} + \left( \frac{k(1.0)n}{k} - \frac{\lfloor k(1.0)n \rfloor}{k} \right) \right)$$

$$\frac{(k \times |dy|) \bmod(|dx|)}{|dx| \times k} = \frac{(k \times |dy|) \bmod(|dx|)}{|dx| \times k} +$$

$$\dots \frac{k(1.0) \frac{\lfloor \frac{k \times |dy|}{|dx|} \rfloor}{k}}{k} - \frac{k(1.0) \frac{\lfloor \frac{k \times |dy|}{|dx|} \rfloor}{k}}{k}$$

$$\frac{(k \times |dy|) \bmod(|dx|)}{|dx| \times k} = \frac{(k \times |dy|) \bmod(|dx|)}{|dx| \times k} +$$

$$\dots \frac{\lfloor \frac{k \times |dy|}{|dx|} \rfloor}{k} = \frac{\lfloor \frac{k \times |dy|}{|dx|} \rfloor}{k}$$

-continued $$\frac{(k \times |dy|) \bmod(|dx|)}{|dx| \times k} = \frac{(k \times |dy|) \bmod(|dx|)}{|dx| \times k}$$

As with the integer Bresenham line algorithm discussed in the background of this patent application, in the present invention it is not necessary for the error term to exist in the same mathematical scale as the slope. The algorithm only needs to know when the error term overflows. In the integer Bresenham line algorithm, the error term represents the minor-axis distance from a given pixel's center to the line, so it overflows when its value exceeds half of a pixel's width. The algorithm can be simplified by subtracting ½ from the error term initially so that the error term is −½ when a line crosses directly over a pixel's center and is 0 when a line passes exactly between two pixels in the minor direction. In this way, the algorithm needs only detect when the sign of the error term changes from negative to positive, indicating an overflow. The same is true of the modified Bresenham technique presented here. The error term is first shifted by −½ of its maximum range and is then scaled so that it contains no fractions. This is accomplished by multiplying all terms related to error by their common denominators. To start, the initial error term $e_0$ is defined.

$$e_0 = \frac{-1}{2 \times k} + (x - x_1) \frac{(k \times |dy|) \bmod(|dx|)}{|dx| \times k} + \dots +$$

$$\left( \frac{k(x - x_1)n}{k} - \frac{\lfloor k(x - x_1)n \rfloor}{k} \right)$$

$$e_0 = \frac{-|dx|}{2} + (x - x_1)((k \times |dy|) \bmod(|dx|)) +$$

$$\dots |dx|(k(x - x_1)n - \lfloor k(x - x_1)n \rfloor)$$

By definition 1, $$e_0 = \frac{-|dx|}{2} + (x - x_1)((k \times |dy|) \bmod(|dx|)) +$$

$$|dx|(k \times n \times k(x - x_1) \bmod(k))$$

The algorithm should start iterating at the center of the pixel that contains the first vertex of the line. The first pixel iterated, (x,y), is defined as follows:

$$x = \lfloor x_1 + 0.5 \rfloor$$

$$y = y_1 + \frac{\lfloor k \times (x_0 - x_1) \times n \rfloor}{k}$$

Now that all of the modified Bresenham terms have been defined, it is possible to implement the algorithm. The following discussion provides computer code and a detailed discussion of the computer code to fully describe the invention.

V. Implementation of the Present Invention
  A. Drawing x-major lines
    1. Computer Code This sample computer code describes a computer procedure, or set of instructions, which draws a line on a computer display according to the present invention using the modified Bresenham algorithm invention described in this disclosure. The sample computer code only draws x-major lines. The next sample discussed in Section V.B. of this disclosure draws both x- and y-major lines.

This computer code is written in ANSI-compliant c-language. Note that c-language delimits base-16 (hexadecimal) numbers with a prefix of '0x', hence 0x20 equals 32 in decimal. Many of the numerical variables in the code use 8-precision fixed-point format, which works as follows. Real numbers are approximated by integers by multiplying with a constant integer to convert from fraction to fixed-point and dividing by the same constant integer to convert from fixed-point to fraction. 8-precision fixed-point format means that real numbers are multiplied by $2^8$ (which is 256, or 0x100) because computers can multiply and divide by powers of 2 very efficiently. For example, the computer would represent the real number 2.25 as (2.25*256=) 576 (which, in hexadecimal, is 0x240). This fixed-point number is converted back to a real number by dividing it by 256 (576/256=) 2.25. Once again, computers can multiply and divide by powers of two very efficiently.

In the following example of computer code used for drawing x-major lines, each pixel contains 256 discrete sub-pixel coordinates (k=256). The line's vertices, $X_1$, $X_2$, $Y_1$, and $Y_2$, are fixed-point numbers with 8 bits of fraction, so an expression such as $(X_1-X_0)$ is equivalent to $k*(x_1-x_0)$ as used in the above equations. The slope, N, is accordingly a 0.8 fixed-point number defined as $k*n$ and the error terms $E_{inc}$ and $E_{dec}$ are adjusted accordingly.

All '&' marks in c-code refer to bitwise logical AND operation in base-16. All '>>' marks in c-code refer to logical shift. For example, 128>>1 right-shifts 128 by 1 bit, which equals 64.

All '&&' marks in c-code refer to logical AND. That is, the expression is TRUE if and only if both operands are TRUE.

```
void mod_bres_1(int X1, int X2, intY1, int Y2)
{
    int X, Y;                  /* Iterated x and y */
    int dx, dy;                /* Delta x and delta y */
    int N;                     /* Slope */
    int E;                     /* Error term */
    int Einc;                  /* Error increment term */
    int Edec;                  /* Error decrement term */
    int coverage;              /* Pixel coverage: 0 . . . 255 */
    int I;
    dx = X2 - X1;
    dy = Y2 - Y1;
    N = (256*dy)/dx;
    Einc = 256*((256*dy)%dx);
    Edoc = 256*dx;
    X = (X1+128)&0xffffff00;
    Y = Y1 + ((N*(X - X1))>>8);
    E = -128*dx + ((N*(X-X1))&0xff)*dx + ((Einc/256)*(X-X1));
    while (E>=0) {             /* Check oveflow */
        Y += 1;
        E -= Edec;
    }
    for(I=X;I<(X2+127);I+=256){
        coverage = 255 -Y & 0xff);   /* Pixel Coverage */
        putpix((X>>8), (Y>>8), coverage);
        putpix((X>>8), (Y+256)>>8, 255 - coverage);
        E += Einc;
        X += 256;
        Y += N;
        while (E >= 0) {       /* Check overflow */
            Y += 1;
            E -= Edec;
        }
    }
}
```

©Copyright Silicon Graphics, Inc. 1995

2. Discussion of Drawing x-major Lines Using the Computer Code in Section V.A.1.

Line 1 names the section of code between line 1 and line 35 'mod_bres_1.' This procedure is invoked with four numerical parameters, or pieces of information, called X1, X2, Y1, AND Y2. These four variable parameters contain the coordinates of the two end points describing a line that the computer is to draw. The endpoints are represented in 8-precision fixed-point.

Lines 3–10 declare integer variables that the procedure uses in calculations.

Line 3 declares X and Y, which successively contain the 8-precision fixed-point X- and Y-coordinates of each pixel that the procedure calculates to be contained in the line that it is drawing.

Line 4 declares dx and dy, which contain the 8-precision fixed-point length of the line along the x-axis and the y-axis.

Line 5 declares N, the integer part of the slope of the line, in subpixels.

Line 6 declares E, the Bresenham error term, which accumulates Einc (declared next) until it overflows, indicating that N under-represents the true slope sufficiently to merit incrementing the minor-axis position by one subpixel unit, at which point E is reset by Edec (declared after Einc).

Line 7 declares Einc, which is an integer representation of the fractional remainder of the slope.

Line 8 declares Edec, which is an integer representation of the range of the remainder of the slope. See the example following the code for clarification.

Line 9 declares 'coverage' which represents the coverage of the current pixel in the range of 0, representing 0% coverage, to 255, representing 100% coverage.

Line 10 declares I, which is an integer counter used to step along the line's coordinates in the direction of the x-axis.

To illustrate the remaining instructions, assume that the mod_bres_1 was invoked with the coordinates 0,0 to 3,1, indicating that the computer is to draw a line between these two points. In 8-precision fixed-point format, X1=0, Y1=0, X2=768, and Y2=256.

Line 11: dx=768–0=768

Line 12: dy=256–0=256

Line 13: N=256*256/768=85 (note that 85 is the 8-precision fixed-point approximation of ⅓. 85/256 0.33203125, which is slightly less than ⅓.)

Line 14: Einc=256*((256*256) mod 768)=65536. This is an integer representation of the remainder of N.

Line 15: Edec=256*dx=196608. This is the denominator for the error term. Dividing Einc by Edec gives the real remainder from the calculation of N. It is critical to realize that (N+(Einc/Edec))/256=(dy/dx). (85+(65536/196608))/256 =⅓. This follows from the mathematical proofs in this disclosure.

Line 16: X=(0+128) & 0xffffff00=0. & is a bitwise logical AND operation in base-16. This operation in line 16 rounds X to the x-coordinate of the pixel nearest the first endpoint, X1.

Line 17: Y=0+85*(0–0)>>8=0. This operation adjusts the starting Y coordinate for any subpixel positioning of the first endpoint of the line.

Line 18: E=–128*768+((85*(0–0)) & 0xff)*768+((256/256)*(0–0))=–98304

Line 19: while (E>=0) instructs the computer to execute the instructions between this line and line 22 so long as E is greater than or equal to 0. E is currently –98304, from line 18, so this section of code is skipped.

Line 23: The computer assigns 0 to I and executes the section of code through line 34 as long as I is less than (X2+127). 256 is added to I each time this section of code repeats. This instructs the computer to consider each value of I between the first x-coordinate of the line and the last x-coordinate of the line. I will assume the value 0, then 256, then 512, then 768. Then the loop will terminate and the mod_bres_1 routine will exit. For now, I=0.

Line 24: coverage=255−0 & 0xff=255. This means that the first pixel has 100% coverage.

Line 25: Put a pixel at the coordinate 0,0 with coverage of 100%.

Line 26: Put a pixel at the coordinate 0,1 with a coverage of 255−255=0%.

Figure 8:
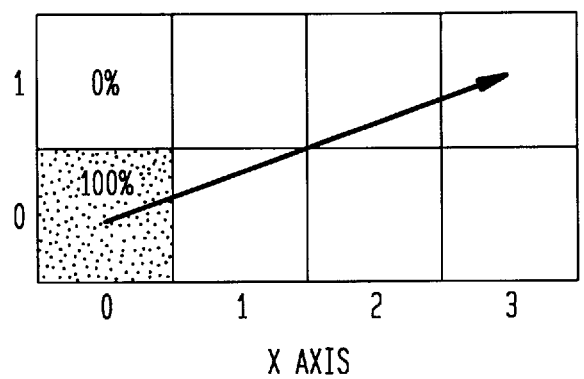
FIG. 8 shows a first step of drawing a line in accordance with the present invention.

Implementation of lines 25 and 26 is shown in FIG. 8.

Line 27: E+=65536. E=−32768

Line 28: X+=256. X=256

Line 29: Y+=85. Y=85

Line 30: This while loop does not execute, since E is negative. The for loop continues.

Line 23: I+=256. I=256. Loop continues.

Line 24: coverage=255−85 & 0xff. Coverage=170. (170/255=66.7%).

Figure 9:
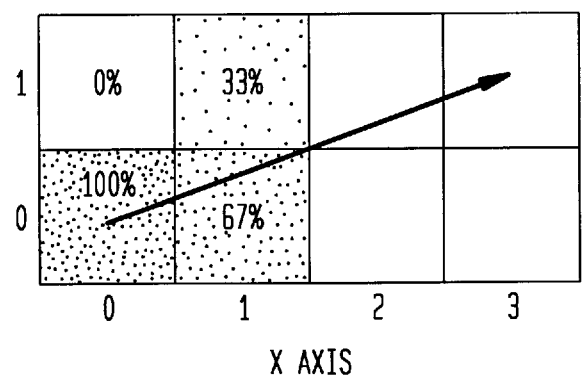
FIG. 9 shows a second step of drawing a line in accordance with the present invention.

Line 25: Put a pixel at the coordinate 1,0 with coverage of 67%:

Line 26: Put a pixel at the coordinate 1,1 with coverage of 33%:

Implementation of repeated lines 25 and 26 is shown in FIG. 9.

Line 27: E+=65536. E=32768.

Line 28: X+=256. X=512.

Line 29: Y+=85. Y=170.

Line 30: The while loop enters, since E>=0

Line 31: Y+=1. Y=171.

Line 32: E−=196608. E=−163840

Line 30: The while loop terminates, since E<0

Line 23: I+=256. I=512. Loop continues.

Line 24: coverage=255−171 & 0xff. Coverage=84. (84/255=33%).

Figure 10:
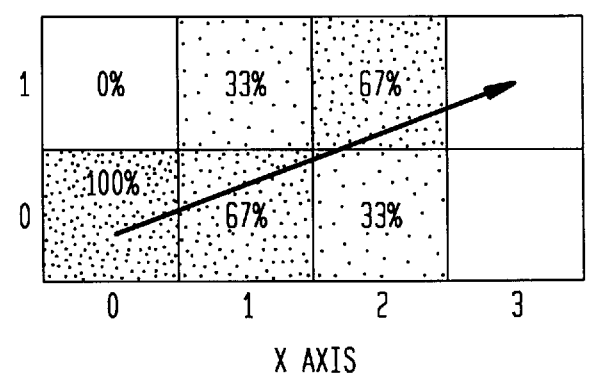
FIG. 10 shows a third step of drawing a line in accordance with the present invention.

Line 25: Put a pixel at the coordinate 2,0 with coverage of 67%:

Line 26: Put a pixel at the coordinate 2,1 with coverage of 33%:

Implementation for repeated lines 25 and 26 is shown in FIG. 10.

Line 27: E+=65536. E=−98304.

Line 28: X+=256. X=768.

Line 29: Y+=85. Y=256.

Line 30: The while loop does not enter, since E<0

Line 23: I+=256. I=768.

Line 24: Coverage=255−Y & 0xff. Coverage=255. (255/255=100%).

Line 25: Put a pixel at the coordinate 3,1 with coverage of 100%.

Line 26: Put a pixel at the coordinate 3,2 with coverage of 0%.

Figure 11:
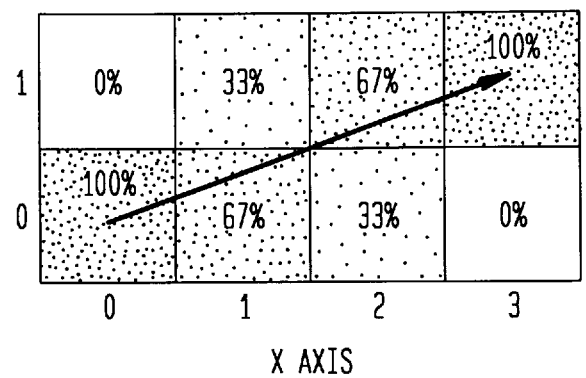
FIG. 11 shows a fourth step of drawing a line in accordance with the present invention.

Implementation of repeated lines 25 and 26 is shown in FIG. 11.

Line 27: E+=65536. E=−32768.

Line 28: X+=256. X=1024.

Line 29: Y+=85. Y=341.

Line 30: The while loop does not enter, since E<0.

Line 23: I+=256. I=1024. The loop terminates since I>(X2+127).

The mod_bres_1 procedure ends and a line has been drawn between the coordinates (0,0 and 3,1).

3. Overview of the Example of Drawing the x-major Line Iterated by the Line-drawing Algorithm Shown in FIGS. 8–11

The overview will be discussed with reference to FIGS. 12 and 13 in combination with the following data: Octant 1; Y-major; X1=0; Y1=0; X2=768(3.00); Y2=256(1.00); dx=768(3.00); dy=256 (1.0); N=85; Einc=65536; and Edec=196608.

Figure 12:
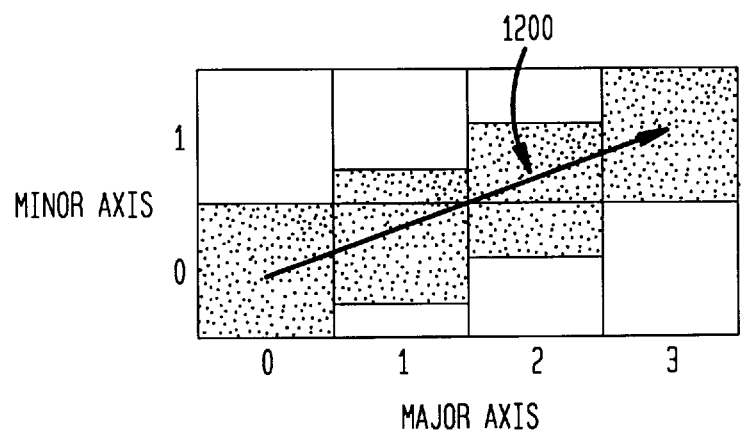
FIG. 12 shows a method of conceptualizing how the human eye should perceive the results of the present invention.
Figure 13:
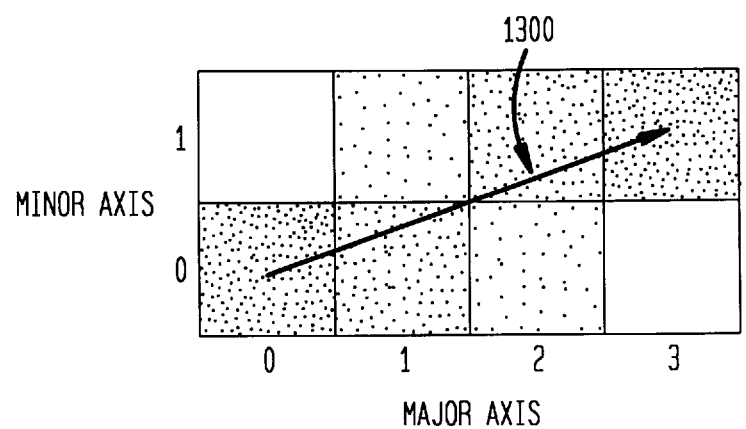
FIG. 13 shows a magnified view of one result of the present invention.

Using the above data in the line drawing algorithm of the present invention, the following data is generated while iterating a line 1200 shown in FIGS. 12 and 13.

| Current: | X = 0 | x = 256 | x = 512 | x = 763 |
|---|---|---|---|---|
| | (0.00) | (1.00) | (2.00) | (3.00) |
| | Y = 0 | Y = 85 | Y = 11 | Y = 256 |
| | (0.00) | (0.55) | (0.71) | (1.00) |
| | LC = (.ff) | LC = (.aa) | LC = (.8e) | LC = (.ff) |
| | UC = (.00) | UC = (.55) | UC = (.71) | UC = (.00) |
| | E = 98304 | E = −32768 | E = −163840e | e = 98304 |
| Next: | X = 256 | X = 512 | X = 768 | |
| | (1.00) | (2.00) | (3.00) | |
| | Y = 85 | Y = 10 | Y = 256 | |
| | (0.55) | (0.70) | (1.00) | |
| | E = −32768 | E = 32768* | E = 98304 | |
| | | E = −163840 | | |
| | | Y = 11 | | |
| | | (0.71) | | |

*represents error overflow condition

Numbers in parenthesis are 0.8 fixed-point hexadecimal; LC=lower-pixel coverage in 0.8 hexadecimal; and UC=upper-pixel coverage in 0.8 hexadecimal. E is the error term. The "current" values are the values for the column of pixels above the respective current values. The "next" values are the values for the next column of pixels.

For purposes of illustration, FIG. 12 and 13 show line 1200 covering eight pixels. Pairs of pixels are vertically juxtaposed along a minor axis of line 1200. FIG. 12 shows the pixel coverage by showing the quantity of subpixels filled in each pixel. This figure illustrates how precisely line 1200 is represented using the line drawing algorithm of the present invention. FIG. 13 shows the pixels lit up with the percentage of coverage. However, when viewed on the monitor, the pixels representing the line will appear to the user as shown in FIG. 12.

To draw line 1200 in accordance with these values arrived at by using the line-drawing algorithm of the present invention, the first pixel on line 1200 is at coordinates (0, 0). The lower coverage of pixel (0, 0) is 100% and the upper coverage of pixel (0, 1) is 0%. To draw the next point on the line, a full pixel step (256 subpixels) is taken along the major axis. Rather than taking full pixel steps along the minor axis, as was done conventionally, subpixel steps are taken along the minor axis. In taking the full pixel step along the major axis, line 1200 steps 85 subpixels along the minor axis. Therefore, the line drawing algorithm calculates coverage values for the vertically juxtaposed pixels with subpixel precision.

The upper pixel coverage is equal to 85/256 or 33% and the lower pixel coverage is equal to 1−(85/256) or 66%.

In the third full pixel step along the major axis, line 1200 steps another 85 subpixels in addition to the previous 85 subpixels. 85+85=170 subpixels. However, because E has become positive, one subpixel is added to 170; 171. Then E is made negative again. At the third step, the coverage of the upper pixel is equal to 171/256 or 67% and the coverage of the lower pixel is equal to 1−(171/256) or 33%.

In the fourth and final full pixel step, line 1200 takes another 85 subpixel steps along the minor axis. 171+85= 256. At the fourth step, the coverage of the upper pixel is 256/256 or 100% and the coverage of the lower pixel is 1−(256/256) or 0%.

4. Additional Derivations

In the c-language example, the error overflow condition is handled by a while loop. This turns out to be unnecessary because at each iteration, $e_{inc}$ is added to the error term unless the term overflows, in which case $e_{dec}$ is subtracted from it. In the worst case, the error term is equal to 0 when $e_{inc}$ is added to it. If $e_{inc}$ can be proven to be strictly less than $e_{dec}$, then an overflow condition can be corrected by subtracting $e_{dec}$ from the error term once and the while loop can, therefore, be replaced with an 'if' statement.

Lemma 3: $e_{inc} < e_{dec when k>0}$ $$\frac{(k \times |dy|) \bmod |dx|}{|dx| \times k} < \frac{1}{k}$$

Observe that:
$(k \times |dy|) \bmod |dx| < |dx|$

So,
$$\frac{(k \times |dy|) \bmod |dx|}{|dx|} < 1.0$$

Therefore:
$$\frac{(k \times |dy|) \bmod |dx|}{|dx|} \times \frac{1}{k} < \frac{1}{k}$$

Reference can be made to FIG. 19 for initialization equation and error overflow conditions for all x-major octants. The information is summarized below where the function sign( ) returns +1 when its argument is positive and −1 when its argument is negative.

$$\frac{-1}{2k} +$$

$$\frac{k \times \text{sign}(dx) \times (x_0 - x_1) \times n - \lfloor k \times \text{sign}(dx) \times (x_0 - x_1) \times n \rfloor}{k} \ldots +$$

$$\text{sign}(dx) \times (x_0 - x_1) \times e_{inc}$$

$$y_0 = y_1 + \text{sign}(dy) \times \frac{\lfloor k \times \text{sign}(dx) \times (x_0 - x_1) \times n \rfloor}{k}$$

Given this information, a full implementation of the algorithm with endpoint filtering for all x-major lines can be performed.

B. Drawing Any Line (Both x- and y-major lines)

The following sample computer code describes a computer procedure, or set of instructions, which draws a line on a computer display using the modified Bresenham algorithm invention described in this disclosure. Unlike the previous sample code discussed in Section A, this sample code is a full implementation of the algorithm and is capable of drawing all types of lines. The code includes provisions for lines with subpixel-precise endpoints (endpoints that do not necessarily fall directly upon pixel centers). Therefore, the following example draws a line similar to that found in the previous example, but further with subpixel-positioned endpoints. Moreover, although this disclosure describes drawing lines, the present invention can be implemented to draw edges, objects, and/or filled-in objects on a display device.

1. Computer Code for Drawing Any Line

As discussed above, this computer code is written in ANSI-compliant c-language. Note that c-language delimits base-16 (hexadecimal) numbers with a prefix of '0x', hence 0x20 equals 32 in decimal. Many of the numerical variables in the code use 8-precision fixed-point format, which works as follows. Real numbers are approximated by integers by multiplying with a constant integer to convert from fraction to fixed-point to fraction. 8-precision fixed-point format means that real numbers are multiplied by $2^8$ (which is 256, or 0x100) because computers can multiply and divide by powers of 2 very efficiently. For example, the computer would represent the real number 2.25 as (2.25*256=)576 (which, in hexadecimal, is 0x240). This fixed-point number is converted back to a real number by dividing it by 256 (576/256=) 2.25. Once again, computers can multiply and divide by powers of two very efficiently.

All '&' marks in c-code refer to bitwise logical AND operation in base-16. All '>>' marks in c-code refer to logical shift. For example, 128>>1 right-shifts 128 by 1 bit, which equals 64.

All '&&' marks in c-code refer to logical AND. That is, the expression is TRUE if and only if both operands are TRUE.

```
void mod_bres_2(int x1, int y1, int x2, int y2)
{
    int X, Y;                /* Iterated x and y */
    int dx, dy;              /* Delta x and delta y */
    int N;                   /* Slope */
    int E;                   /* Error term */
    int Einc;                /* Error increment */
    int Edec;                /* Error decrement */
    int coverage;            /* Pixel coverage, 0..255 */
    int I;
    int ix, iy;              /* Sign of dx and dy */
    X = x1;
    Y = y1;
    dx = (x2 - x1);          /* Set deltas, increments */
    if(dx < 0){
        dx * = -1;
        ix = -1;
    }
    else
    ix = 1;
    dy = (y2 - y1);
    if(dy < 0){
        dy * = -1
        iy = -1;
    }
    else
    iy = 1;
    if(dx >= dy){            /* X major */
        N = (256*dy) / dx;
        Einc = 256*((256*dy) % dx);
        Edec =256*dx;
        X = (x1 + 128)&0xffffff00;
        Y = y1 + iy*(N*ix*(X - x1))>>8);
        E = -128*dx+((N*ix*(X-x1))&0xff)*dx+((Einc>>8)*ix*(X-x1));
        if(((iy==1) ? E >= 0 : E > 0)&& 2*dx){
            Y += iy;
            E -=Edec;
        }
                             /* First endpoint */
        coverage = (ix==1 ?
            ((255-Y&0xff)*(255-((x1+128)&0xff))) >> 8:
            ((255-Y&0xff)*((x1+128)&0xff)) >> 8);
        putpix(((x1+128)>>8), (Y>>8), coverage);
        coverage = (ix==1 ?
            ((Y&0xff)*(255-((x1+128)&0xff))) >> 8:
            ((Y&0xff)*((x1+128)&0xff)) >> 8);
        putpix(((x1+128)>>8), ((Y+256)>>8), coverage);
        E += Einc;
        X += ix<<8;
        Y += iy*N;
```

```
        if(((iy==1) ? E >=0 : E > 0)&& 2*dx){
            Y += iy;
            E -= Edec;
        }
                    /* Iterate the line */
        for (I=X; ix==1? I<(x2-127) : I>(x2+128); I+=ix*256)
        {
            coverage = 255-Y&0xff;
            putpix((X>>8), (Y>>8), coverage);
            putpix((X>>8), (Y+256)>>8, 255-coverage);
            E += Einc;
            X += ix<<8;
            Y += iy*N;
            if(((iy==1) ? E >= 0 : E > 0)&& 2*dx){
                Y += iy;
                E -= Edec;
            }
        }
                    /* Second endpoint */
        coverage = (ix==1 ?
            ((255-Y&0xff)*((x2+128)&0xff)) >> 8:
            ((255-Y&0xff)*(255-((x2+128)&0xff))) >> 8);
        putpix((X)>>8, Y>>8, coverage);
        coverage = (ix==1 ?
            ((Y&0xff)*((x2+128)&0xff)) >> 8:
            ((Y&0xff)*(255-((x2+128)&0xff))) >> 8);
        putpix((X)>>8, (Y+256)>>8, coverage);
    }
    else {              /* Y major */
        N = (256*dx) / dy;
        Einc = 256*((256*dx) % dy);
        Edec = 256*dy;
        Y = (y1 + 128)&0xffff00;
        X = x1 + ix*((N*iy*(Y - y1))>>8);
        E = -128*dy+((N*iy*(Y-y1))&0xff)*dy+((Einc>>8)*iy*(Y-y1));
        if(((ix==1) ? E >= 0 : E > 0)&& 2*dy){
            X += ix;
            E -= Edec;
        }
                    /* First endpoint */
        coverage = (iy==1 ?
            ((255-X&0xff)*(255-((y1+128)&0xff))) >> 8:
            ((255-X&0xff)*((y1+128)&0xff)) >> 8);
        putpix(((y1+128)>>8), (X>>8), coverage);
        coverage = (iy==1 ?
            ((X&0xff)*(255-((y1+128)&0xff))) >> 8:
            ((X&0xff)*((y1+128)&0xff)) >> 8);
        putpix(((y1+128)>>8), ((X+256)>>8), coverage);
        E += Einc;
        Y += iy<<8;
        X += ix*N;
        if(((ix==1) ? E >=0 : E > 0)&& 2*dy){
            X += ix;
            E -= Edec;
        }
                    /* Iterate the line */
        for (I=Y; iy==1? I<(y2-127) : I>(y2+128); I+=iy*256)
        {
            coverage = 255-X&0xff;
            putpix((Y>>8), (X>>8), coverage);
            putpix((Y>>8), (X+256)>>8, 255-coverage);
            E += Einc;
            Y += iy<<8;
            X += ix*N;
            if(((ix==1) ? E >= 0 : E >0)&& 2*dy){
                X += ix;
                E -= Edec;
            }
        }
                    /* Second endpoint */
        coverage = (iy==1 ?
            ((255-X&0xff)*((y2+128)&0xff)) >> 8:
            ((255-X&0xff)*(255-((y2+128)&0xff))) >> 8);
        putpix((Y)>>8, X>>8, coverage);
        coverage = (iy==1 ?
            ((X&0Xff)*((y2+128)&0Xff)) >> 8:
            ((X&0xff)*(255-((y2+128)&0xff))) >> 8);
        putpix((Y)>>8, (X+256)>>8, coverage);
    }
}
```

© Copyright Silicon Graphics, Inc. 1995

2. Discussion of Drawing Any Line Using the Computer Code in Section V.B.1.

a. Initialization

Line 1 names the section of code between line 1 and line 37 'mod_bres_2.' This procedure is invoked with four numerical parameters, or pieces of information, called X1, Y1, X2, and Y2. These four variable parameters contain the coordinates of the two end points describing a line that the computer is to draw. The endpoints are represented in 8-precision fixed-point.

Lines 3–13 declare integer variables that the procedure uses in calculations.

Line 3 declares X and Y, which successively contain the 8-precision fixed-point X- and Y-coordinates of each pixel that the procedure calculates to be contained in the line that it is drawing.

Line 4 declares dx and dy, which contain the 8-precision fixed-point length of the line along the x-axis and the y-axis.

Line 5 declares N, the integer part of the slope of the line, in subpixels.

Line 6 declares E, the Bresenham error term, which accumulates Einc (declared next) until it overflows, indicating that N under-represents the true slope sufficiently to merit incrementing the minor-axis position by one subpixel unit, at which point E is reset by Edec (declared after Einc).

Line 7 declares Einc, which is an integer representation of the fractional remainder of the slope.

Line 8 declares Edec, which is an integer representation of the range of the remainder of the slope.

Line 9 declares 'coverage' which represents the coverage of the current pixel in the range of 0, representing 0% coverage, to 255, representing 100% coverage.

Line 10 declares I, which is an integer counter used to step along the line's coordinates in the direction of the x-axis.

Line 11 declares ix and iy, which are signed integers that indicate the general direction of the line: If the line goes from left to right, then ix=+1, otherwise ix=−1. If the line goes bottom to top, then iy=+1, otherwise iy=−1.

Line 12 assigns X the value of x1, the x coordinate of the first endpoint of the line.

Line 13 assigns Y the value of y1, the y coordinate of the first endpoint of the line.

Figure 14:
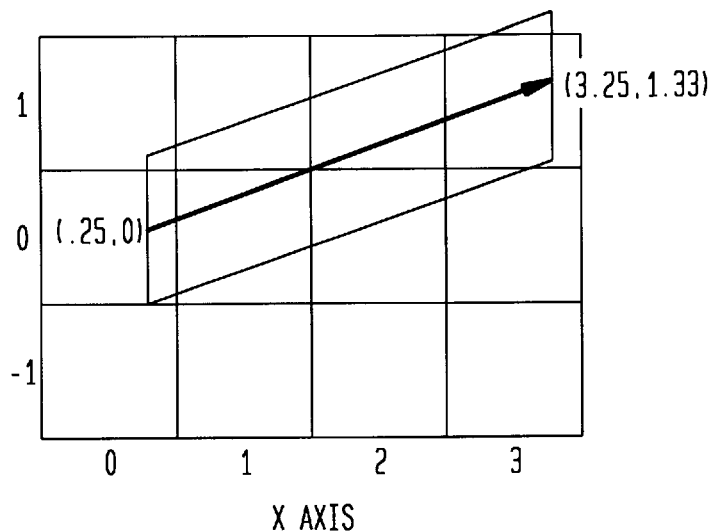
FIG. 14 shows another line drawn in accordance with the present invention.

To illustrate the remaining instructions, assume that the mod_bres_1 was invoked with the coordinates 0.25,0 to 3.25,1.332, indicating that the computer is to draw a line between these two points as illustrated in FIG. 14. In 8-precision fixed-point format, X1=64, Y1=0, X2=832, and Y2=341.

It is important to note that the endpoints (referred to as 'Italian-cut' since they are parallel to the y-axis, rather than perpendicular to the line) dictate that the left end of the line should cover only 25% of the two vertically juxtaposed pixels at the left end of the line, while the right end of the line should cover 75% of the two vertically juxtaposed pixels at the right end of the line.

Line 14: dx=832−64=768

Line 15: if (dx<0), this condition is not true, so the computer skips to the 'else' clause on lines 19 and 20.

Line 20: ix=1, indicating that the line goes generally left to right, not right to left.

Line 21: dy=341−0=341

Line 22: if (dy<0), this condition is not true, so the computer skips to the 'else' clause on lines 26 and 27.

Line 27: iy=1, indicating that the line goes generally bottom to top, not top to bottom.

b. x-major lines

Line 28: if (if dx>=dy), which is true, meaning that the line is x-major (it is longer in the x-axis than in the y-axis). The computer centers the section of code from line 29 to line 36. This section of code handles x-major lines, while the following section of code handles y-major lines.

Line 29: N=(256*341)/768=113 (note, this is an integer division, so the remainder is disregarded)

Line 30: Einc=256*((256*341) mod 768)=256*512= 131072

Line 31: Edec=256*768=196608

Line 32: X=(64+128) & 0xffffff00=0

Line 33: Y=0+1*(113*1*(0−64))>>8)=−29

Line 34: E=−128*768+((113*1*(0−64))&0xff)*768+( (131072>>8))=−98304+147456+−32768=16384

Line 35: if ((true statement, since E>=0)&& true statement). The conditions for this if statement are satisfied, so the code from lines 36 to 38 is executed.

Line 36: Y+=1. Y=−28.

Line 37: E−=196608. E=−180224

Line 40: coverage=(ix==1? ... : ... which is true, so the first of the two following statements is used:
coverage=((225−−28&0xff)*(255−((x1+128) & 0xff))) >>8
coverage=(27*63)>>8=6 (6/255=2%)

Figure 15:
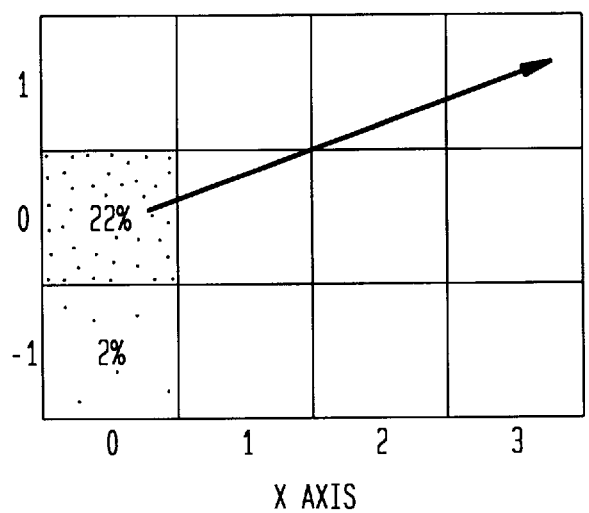
FIG. 15 shows a first step of drawing a line in accordance with the present invention.

Referring now to page 25 of the code:

Line 1: putpix (0, −1, 2%). See FIG. 15.

Line 2: coverage=(ix==1? ... : ... which is true, so the first of the two following statements is used:
coverage=((−28 & 0xff)*(255−((64+128) & 0xff))>>8
coverage=(228*63)>>8=56 (56/255=22%)

Line 5: putpix(0, 0, 22%). See FIG. 15.

Line 6: E+=131072. E=−49152

Line 7: X+=256. X=256

Line 8: Y+=113.=85

Line 14: for (I=256; I<705; I+=256) While I<705, we execute the code from lines 16' to 26'.

Line 16: coverage=255−Y&0xff. Coverage=170 (170/255=66.7%)

Figure 16:
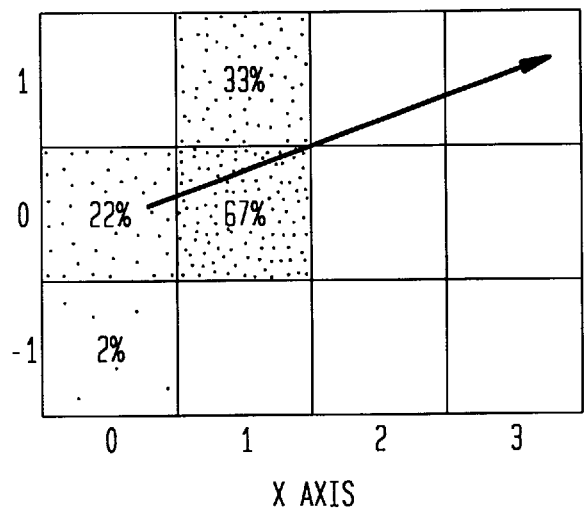
FIG. 16 shows a second step of drawing a line in accordance with the present invention.

Line 17: putpix (1, 0, 170). See FIG. 16.

Line 18: putpix (1, 1, 85). See FIG. 16.

Line 19: E+=131072. E=81920

Line 20: X+=256. X=512.

Line 21: Y+=113. Y=198.

Line 22: if (true condition, since E>=0)

Line 23: Y+=1. Y=199

Line 24: E−=196608. E=−114688

Line 14: for loop. I=512. Loop continues, since I<705.

Line 16: coverage=255−199=56(56/255=22%)

Figure 17:
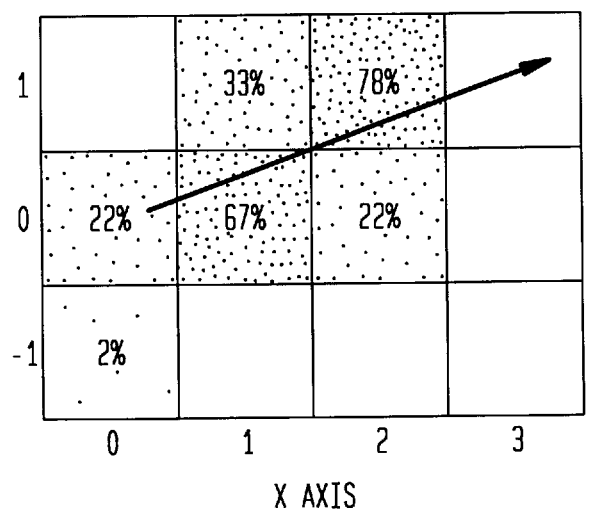
FIG. 17 shows a third step of drawing a line in accordance with the present invention.

Line 17: putpix (2, 0, 56). See FIG. 17.

Line 18: putpix (2, 1, 199). See FIG. 17.

Line 19: E+=131072. E=16384

Line 20: X+=256. X=768

Line 21: Y+=113. Y=199

Line 22: if (true condition, since E>=0)

Line 23: y+=1. y=313

Line 24: E−=196608. E=−180224

Line 14: for loop. I−768. Loop ends, since I>=705. Code continues on line 28

Line 28: coverage=((255−57)*((832+128)& 0xff))>>8− 198*192>>8=148(148/255=58)

Figure 18:
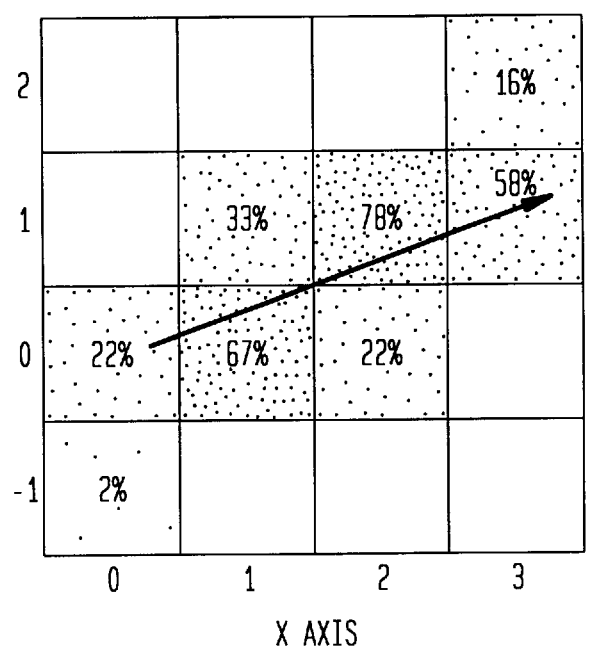
FIG. 18 shows a fourth step of drawing a line in accordance with the present invention.

Line 31: putpix (3, 1, 148). See FIG. 18.

Line 32: coverage=(57*((832+128) & 0xff))>>8= 57*192>>8=42 (42/255=16%)

Line 35: putpix (3, 2, 42). See FIG. 18.

Note that the left two vertically juxtaposed pixels have 24% (22%+2%) coverage, in rough accordance with the 25% coverage dictated by the left endpoint's subpixel position. The right two vertically juxtaposed pixels have 74% (58%+16%) coverage, in rough accordance with the 75% coverage dictated by the right endpoint's subpixel position.

c. y major

Pages 30–31 of the code for drawing Y-major lines are substantially the same as for drawing the X-major line, however, y replaces x and dy replaces dx in some of the calculations. Accordingly, a detailed discussion is not provided.

VI. Table in FIG. 19

Figure 1:
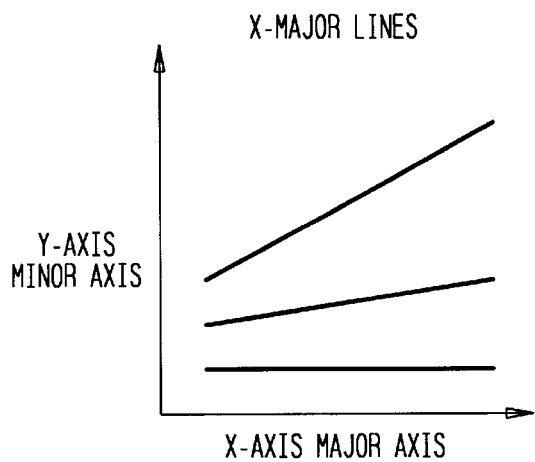
FIG. 1 shows X-major lines.
Figure 2:
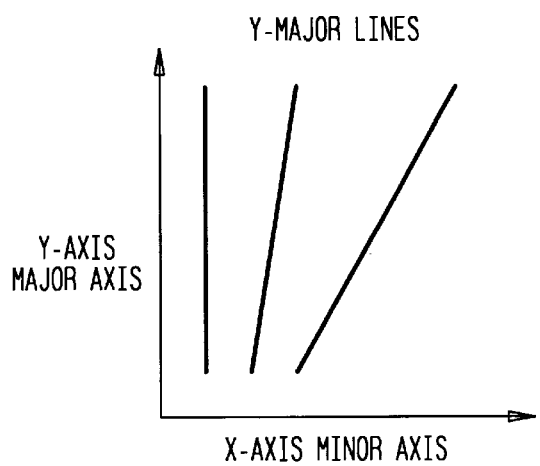
FIG. 2 shows Y-major lines.
Figure 3:
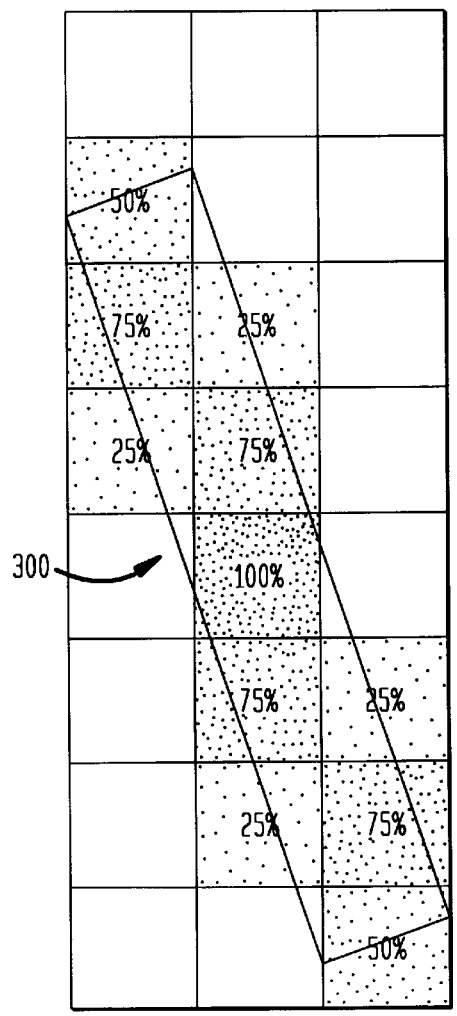
FIG. 3 shows pixel coverage for a line.

The initial values for the error term $E_0$ and the first minor-axis position ($y_0$) were derived only for octant 1 (refer to FIG. 1 for a diagram of the octants). The signs of some of the terms in $E_0$ and $y_0$ must be negated to compute the initial values of these terms in other octants. The table in FIG. 19 summarizes the initial values with the correct signs for all four x-major octants. The table also illustrates the arithmetic sign of dx (delta x, or the width along the x-axis of a line) and dy (delta y, or the width along the y-axis of a line) for each of the four x-major octants. Last, the table summarizes whether the modified Bresenham's algorithm should consider an overflow condition when e, the error term, is equal to 0.0, in addition to the condition when e is greater than 0.0. The four y-major octants are derived from the four x-major octants by taking the equations from FIG. 23 and swapping dx and dy and also swapping x and y.

VII. Term Limits and Time Complexity

Now the limits of each term for storage requirements will be discussed. In the following discussion, assume that the display size is 2048×2048 pixels with eight bits of subpixel precision.

x, y, dx, and dy: All four of these terms have a domain of [0x0.00, 0x7ff.ff] and therefore require 19 bits of storage.

N: Note that the line must be x-major. At most, k+1 subpixel steps can be taken in the y-axis (minor axis) for each step in x (major axis), so N<=k+1.

$N_{max}$=(256*0x7ff.ff)/0x7ff.ff=0x100

$N_{min}$=(256*0x000.00)/0x7ff.ff=0x0

N therefore requires 9 bits of storage.

$E_{inc}$:

$E_{incmax}$=256*((256*dy)% 0x7ff.ff)=0x7ffe.00

$E_{incmin}$=256*((256*0)% 0x7ff.ff)=0x0

$E_{inc}$ therefore requires 27 bits of storage $E_{dec}$:

$E_{decmax}$=256*0x7ff.ff=0x7ffff.00

$E_{decmin}$=256*0=0x0

$E_{dec}$ therefore requires 27 bits of storage

E:

Lemma 3 states that $e_{inc} < e_{dec}$, so E's range is $[-e_{dec}, +e_{dec}]$ inclusive (depending on whether an overflow condition occurs when E>0 or E>=0), so E needs 1 bit more than $e_{dec}$. E therefore requires 28 bits of storage.

The time complexity of the algorithm is O(N). The algorithm has a fixed initialization including a div and mod (in the case of 8 bits of subpixel resolution, the div can yield at most 9 bits in the result) and proceeds with a straightforward loop along the line's major axis. Within each loop iteration, the error term can overflow only once. Therefore the running time of the algorithm is linear.

VIII. Computer Implementation

Figure 20:
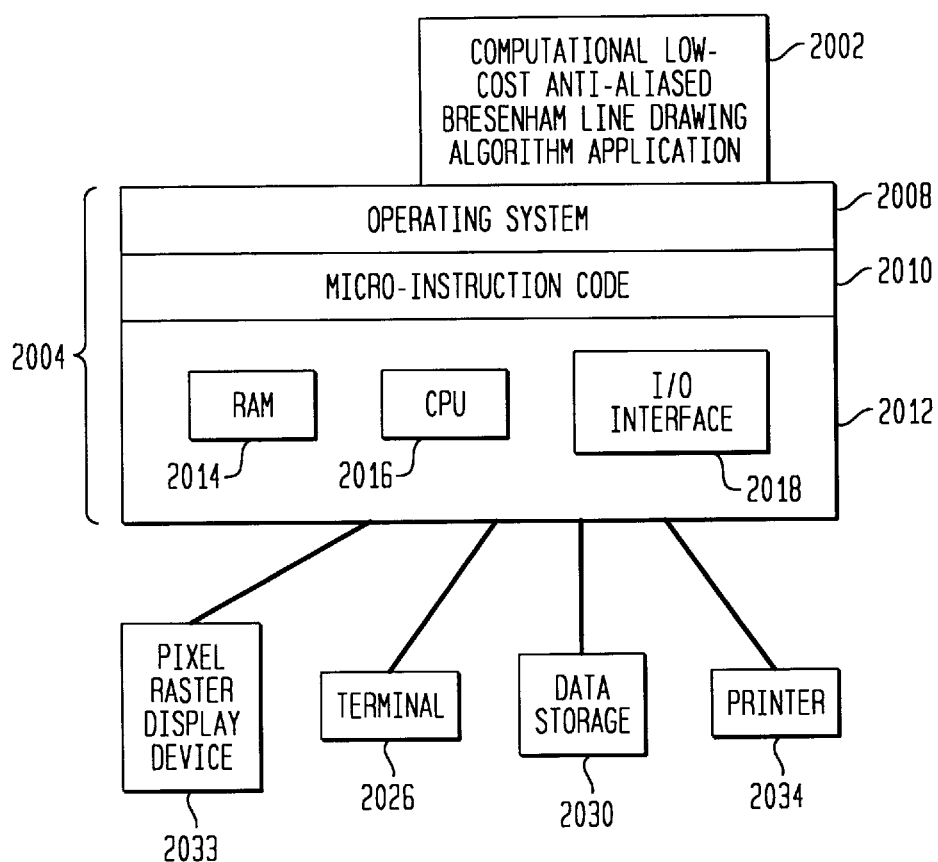
FIG. 20 shows a computer platform supporting a software application in accordance with the present invention.
Figure 21:
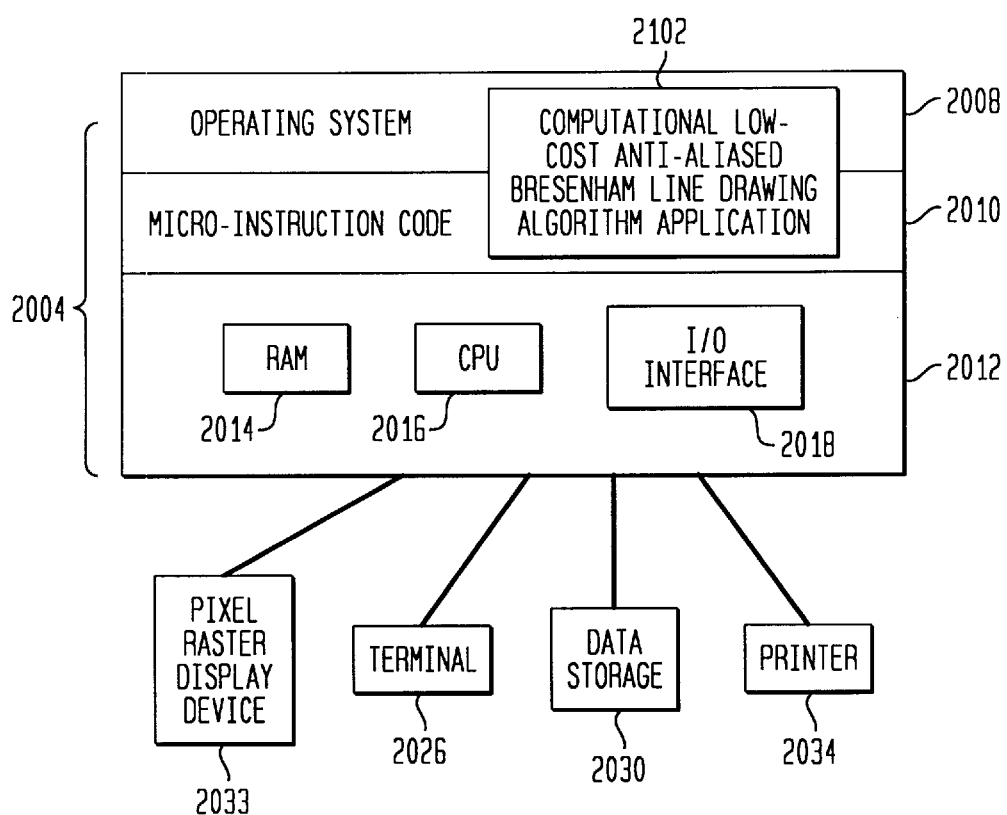
FIG. 21 shows a computer platform supporting a hardware application in accordance with the present invention.

A computational low-cost anti-aliased Bresenham line algorithm in accordance with the present invention may be implemented in the computer's hardware or its software. FIG. 21 is a block diagram for a hardware implementation of the present invention. FIG. 20 is a block diagram for a software implentation of the present invention.

Generally, FIGS. 20 and 21 illustrate a computer platform 2004. Computer platform 2004 includes certain hardware units 2012, including one or more central processing units (CPU) 2016, a random access memory (RAM) 2014, and an input/output (I/O) interface 2018. A computer platform 2004 includes an operating system 2008, and may include micro-instruction code 2010. Various peripheral components may be connected to the computer platform 2004, such as a terminal 2026, a data storage device 2030, a printing device 2034, and a pixel raster display device 2033. Data storage 2030 may include, for example, a floppy disk or some other removable storage medium, which is read by the floppy drive or some other storage unit. A computer platform 2004 may also be connected to a network.

Referring now to FIG. 21, the hardware implementation will be discussed where the computational low-cost anti-aliased Bresenham line drawing algorithm is shown at 2102. This embodiment of the invention is implemented primarily in the hardware using, for example, a hardware state machine. The hardware state machine would make use of the operating system, the micro-instruction code, and possibly other resources of the computer. Implementation of the hardware state machine to perform the function of the present invention will be apparent to persons skilled in the relevant arts.

A computational low-cost anti-aliased Bresenham line drawing algorithm application in accordance with the present invention may also be implemented in the computer software. In this implementation, the application shown generally at 2002 is implemented as a series of instructions or micro-instructions which are executed by the computer's CPU 2016 (or micro-processor) or by co-processor units. The computational low-cost anti-aliased Bresenham line drawing algorithm application 2002 in its software embodiment uses operating system 2008 and possibly the computer's micro-instruction code 2010.

In another embodiment, the invention is directed to a computer program product comprising a computer readable medium having control logic (computer software) store therein. The control logic, when executed by the processor, causes the processor to perform the functions of the invention as describe herein.

IX. Brightness Correction

Once the line-drawing algorithm has determined the coordinates and coverages of the pixels that best represent a given line, another algorithm must be used to assign a brightness level to each pixel along the line. One algorithm is disclosed in Applicant's related co-pending patent application Ser. No. 08/634,875. In this patent application, a coverage-to-brightness conversion is disclosed that yields improved quality anti-aliased lines.

IX. Conclusion

While the invention has been particularly shown and described with reference to preferred embodiments thereof, it will be understood by those skilled in the prior art that various changes in form and details may be made therein without departing from the spirit and scope of the invention.

What is claimed is:

1. A method of drawing an anti-aliased line, comprising the steps of:
   (a) determining a first length in sub pixels of the line along a major axis of the line;
   (b) determining a second length in sub pixels of the line along a minor axis of the line;
   (c) calculating a slope of the line;
   (d) quantizing the slope to any one of a set of number values;
   (e) calculating an error value if the quantized slope has a remainder;
   (f) calculating a coverage value without performing division;
   (g) adjusting the coverage based on the error value;
   (h) drawing a point for the line utilizing a first pixel and a second pixel orthogonally juxtaposed with the first pixel along the minor axis of the line, wherein the step of drawing the point comprises:
      (1) drawing the first pixel having a first coverage equal to the coverage value, and
      (2) drawing the second pixel having a second coverage equal to one minus the coverage value; and
   (i) iterating steps (g) and (h) until the line is complete.

2. A method according to claim 1, wherein step (d) comprises quantizing the slope to a number value that is divisible by a power of two, wherein a difference between the slope and the number value is the remainder.

3. A method according to claim 1, wherein step (e) further comprises the steps of:
   (1) calculating an incremental error, wherein the incremental error is an integer representation of the remainder; and
   (2) calculating a decremental error.

4. A method according to claim 3, further comprising the step of:
   adjusting the error value to be a negative error value after step (e).

5. A method according to claim 4, further comprising the steps of:
   stepping one pixel along the major axis of the line after each point is drawn; and
   adding $E_{inc}$ to the error value for each one pixel step along the major axis of the line.

6. A method according to claim 5, further comprising the step of:
   subtracting the decremental error from the error value when the error value becomes non-negative.

7. A method according to claim 5, wherein step (g) comprises the steps of:
   adding one subpixel to the coverage value when the error value is non-negative, and
   subtracting the decremental error from the error value.

8. A method according to claim 1, wherein step (h)(1) comprises the step of:

stepping a first quantity of subpixels along the minor axis in a first direction, wherein the first quantity of subpixels represents the first coverage, and wherein step (h)(2) comprises the step of:

stepping a second quantity of subpixels along the minor axis of a second direction opposite to the first direction, wherein the second quantity of subpixels represents the second coverage.

9. A method according to claim 1, wherein the step of calculating the coverage value comprises:

calculating a minor axis coverage value along the minor axis for each point on the line, and calculating a major axis coverage value along the major axis for each point on the line that is an endpoint.

10. A method according to claim 1, further comprising the step of:

drawing a plurality of anti-aliased lines to comprise an outline of a geometric shape.

11. A method according to claim 10, further comprising the step of filling in the outline of the geometric slope.

12. A method of drawing an anti-aliased line, the line having a major axis and a minor axis, comprising the steps of:

(a) generating coordinates for pixels covered by the line;

(b) dividing each pixel into k subpixels along the minor axis of the line wherein the number of said k subpixels is a quantity divisible by 2 without yielding a remainder;

(c) generating coverage values for said pixels covered by the line by iterating the minor-axis coordinate of the line with subpixel precision; and (d) determining a coverage for neighboring pixels along the minor axis of the line with subpixel precision.

13. A method according to claim 12, wherein step (d) comprises the steps of:

dividing the number of subpixels along the minor axis by the number of subpixels in a full pixel increment along the line's major axis to arrive at a first coverage; and subtracting said first coverage from one to arrive at a second coverage, wherein an upper pixel of said neighboring pixels has said first coverage and a lower pixel of said neighboring pixels has said second coverage.

14. A method according to claim 12, further comprising the step of:

(e) iterating the line by moving along the line's minor axis in a subpixel increment for each full pixel increment along the line's major axis.

15. A method of drawing an anti-aliased line, comprising the steps of:

(a) determining a first length of the line along a major axis of the line;

(b) determining a second length of the line along a minor axis of the line;

(c) calculating a slope of the line;

(d) quantizing said slope to any one of a set of number values;

(e) calculating an error value if said quantized slope has a remainder;

(f) calculating a coverage value without performing division;

(g) drawing a first point on the line having a first coverage value; and (h) iterating steps (f) and (g) until the line is complete.

16. A method of drawing an anti-aliased line, the line having a major axis and a minor axis, comprising the steps of:

(a) calculating a coverage value without performing division;

(b) drawing a point for the line using a first pixel and a second pixel vertically juxtaposed with said first pixel along the minor axis of the line, wherein said drawing is comprised of:

(i) drawing said first pixel having a first coverage equal to said coverage value, and (ii) drawing said second pixel having a second coverage equal to one minus said coverage value; and (c) iterating steps (a) and (b) until the line is complete.

17. A method of drawing at least one of an anti-aliased line and an anti-aliased edge, comprising the steps of:

(a) calculating a coverage value with sub-pixel precision; and (b) drawing said at least one of a line and an edge using said coverage value, wherein said drawing step is comprised of:

(i) drawing a point for said at least one line and edge using a first pixel and a second pixel vertically juxtaposed with said first pixel along a minor axis of the line, wherein the step of drawing said point comprises, drawing said first pixel having a first coverage equal to said coverage value, and drawing said second pixel having a second coverage equal to one minus said coverage value; and (ii) iterating the above steps until said at least one line and edge is complete.

* * * * *